Jan. 10, 1961   R. C. SMITH ET AL   2,967,720
DETACHABLE GOOSENECK FOR TRAILERS AND THE LIKE
Filed Feb. 7, 1958   6 Sheets-Sheet 1
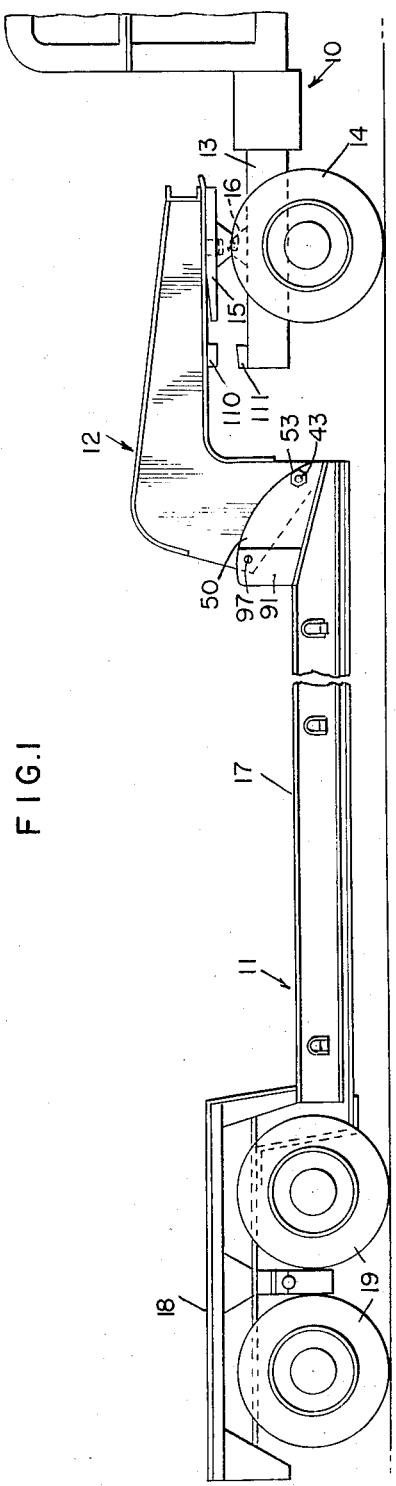
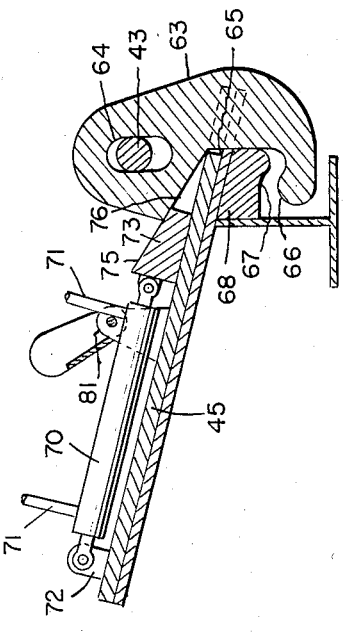
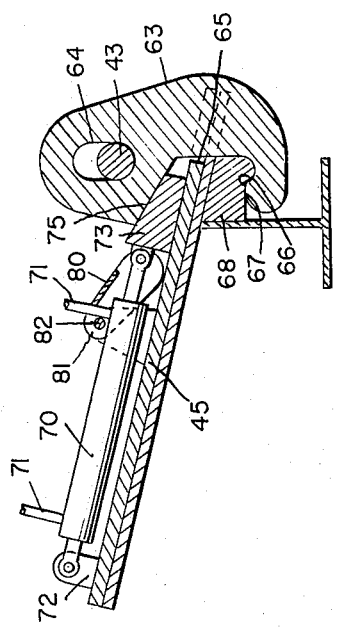
INVENTORS
Rudolph C. Smith
Elmer Benson, Jr.
BY
ATTY Jan. 10, 1961    R. C. SMITH ET AL    2,967,720
DETACHABLE GOOSENECK FOR TRAILERS AND THE LIKE
Filed Feb. 7, 1958    6 Sheets-Sheet 2
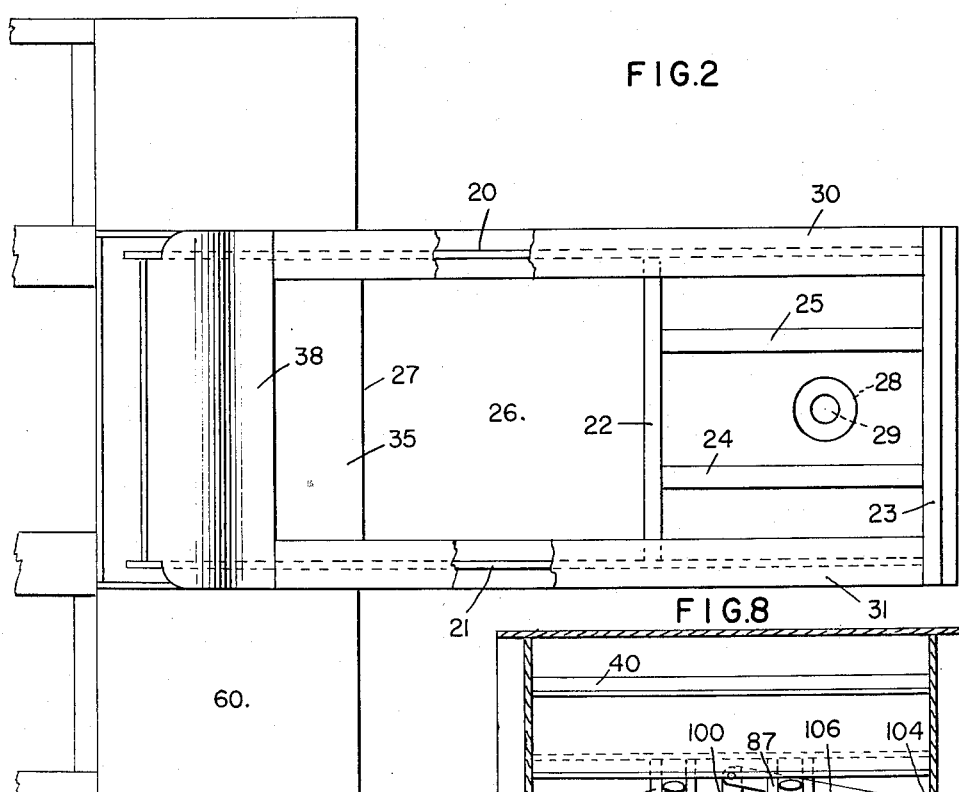
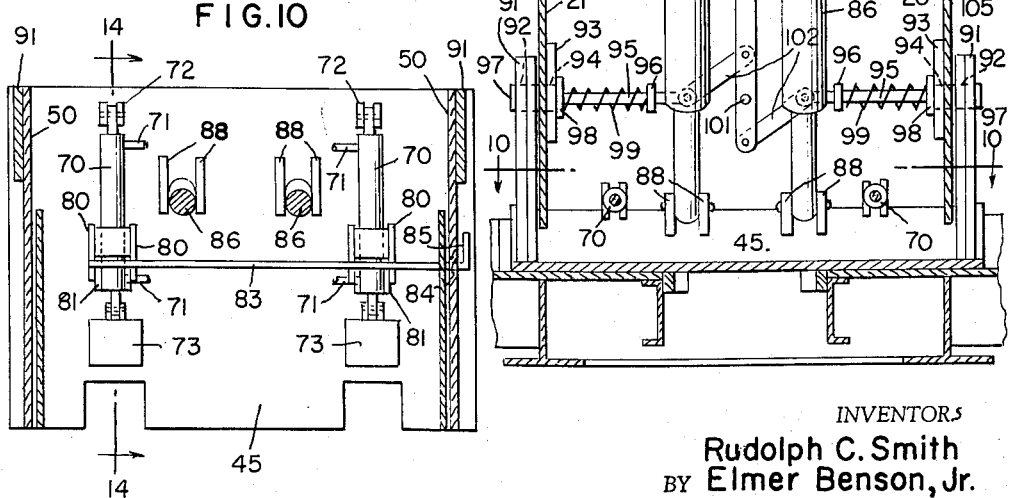
INVENTORS
Rudolph C. Smith
BY Elmer Benson, Jr.
ATTY

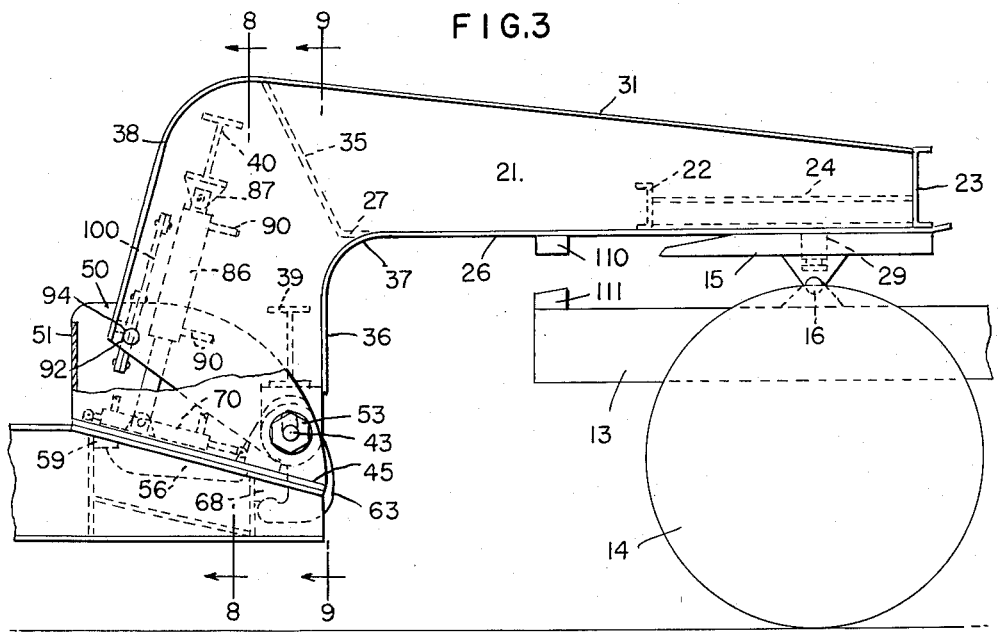
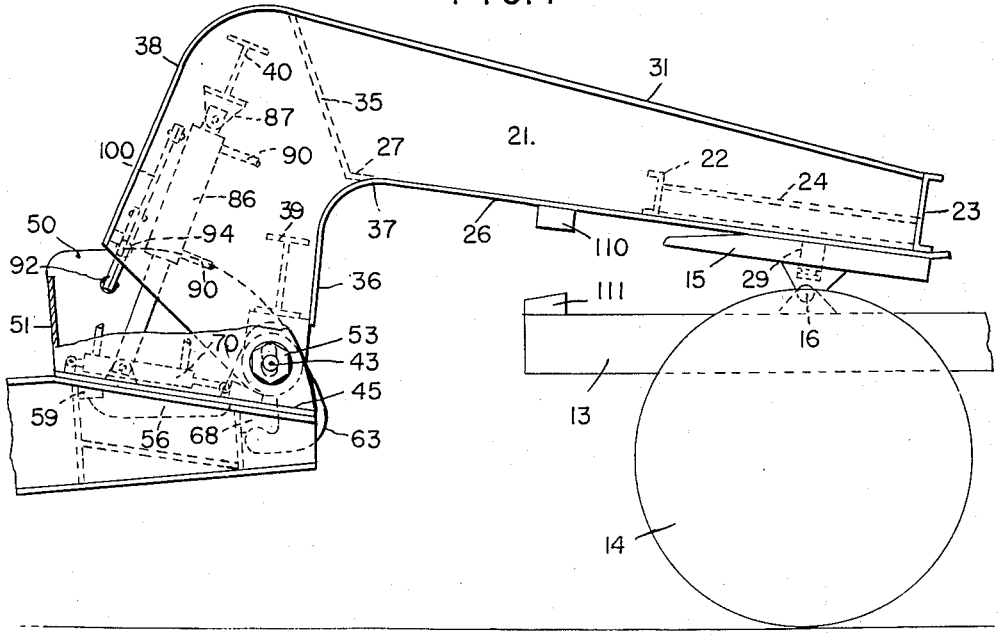

INVENTORS
Rudolph C. Smith
BY Elmer Benson, Jr.

ATTY

Jan. 10, 1961 R. C. SMITH ET AL 2,967,720
DETACHABLE GOOSENECK FOR TRAILERS AND THE LIKE
Filed Feb. 7, 1958 6 Sheets-Sheet 5
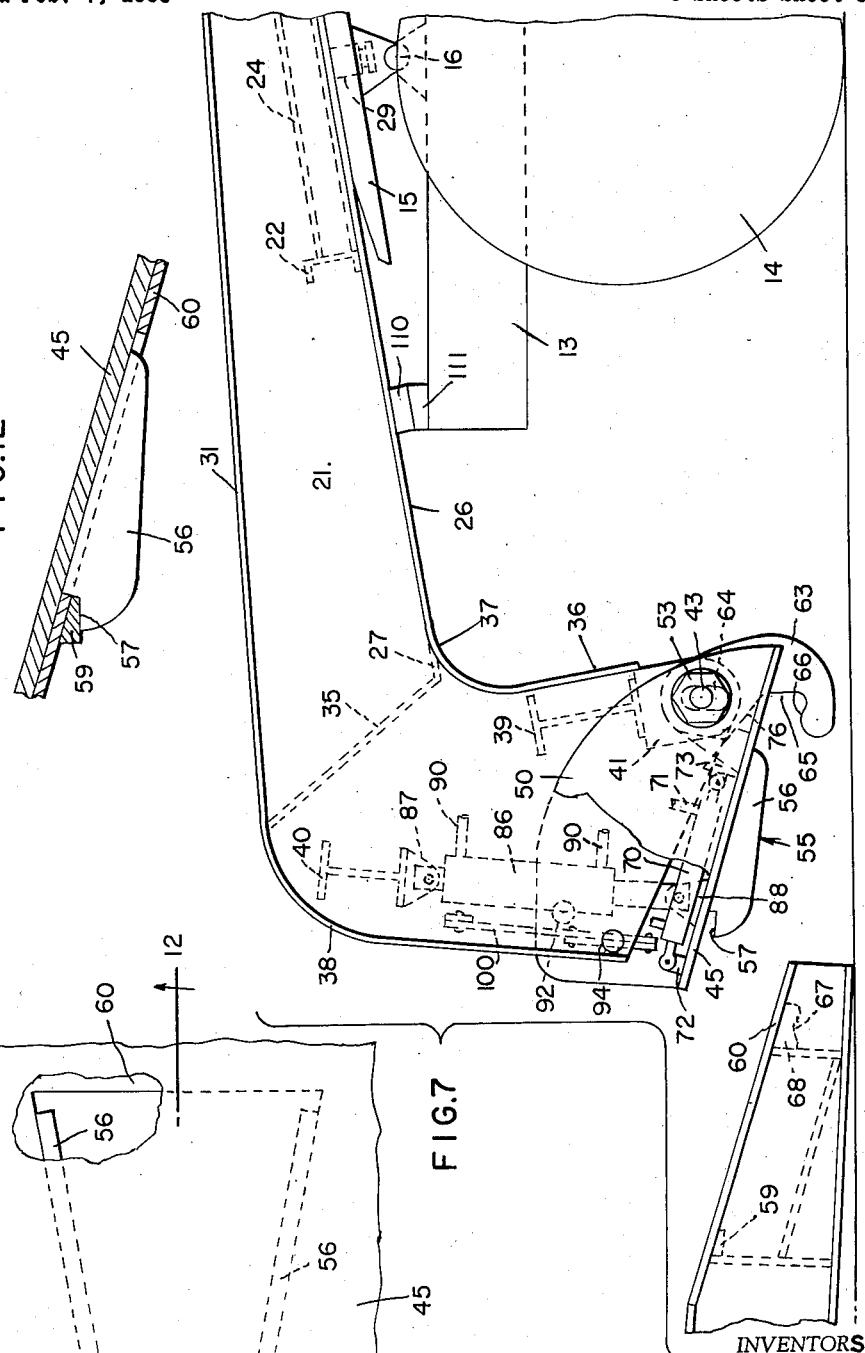
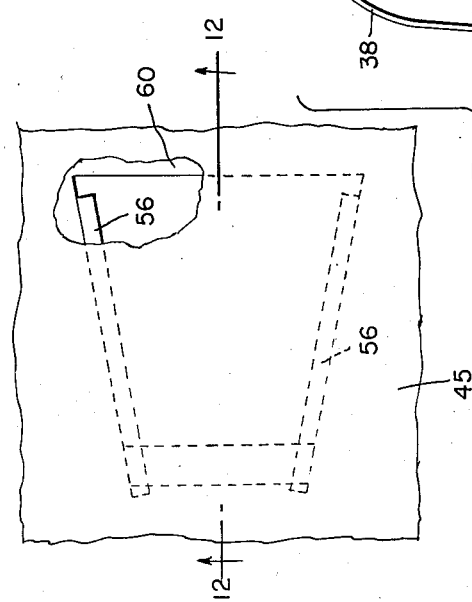
INVENTORS
Rudolph C. Smith
BY Elmer Benson, Jr.
Arthur Middleton
ATTY

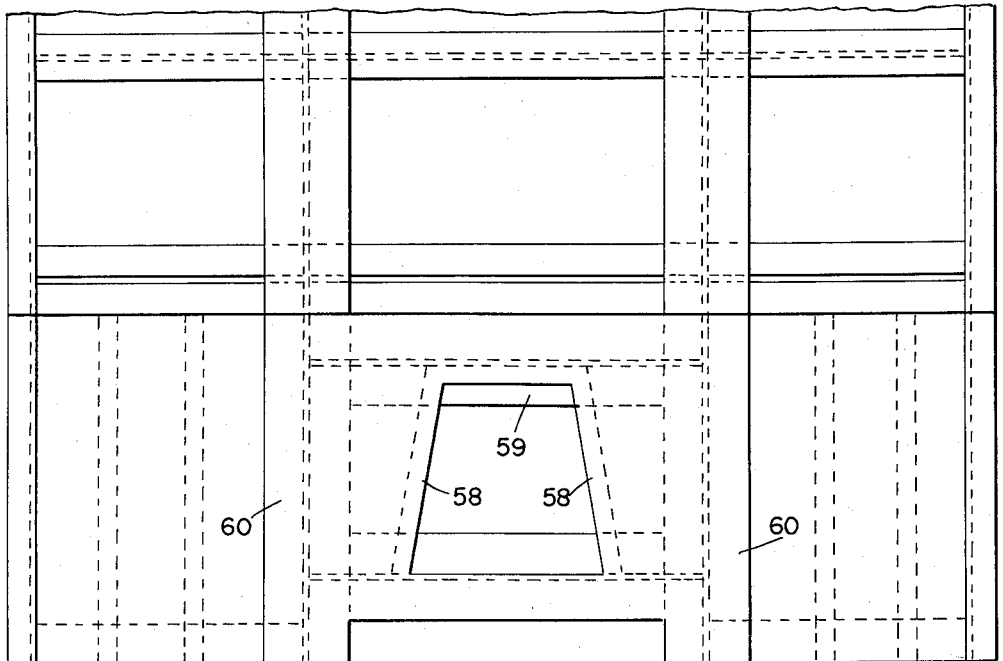
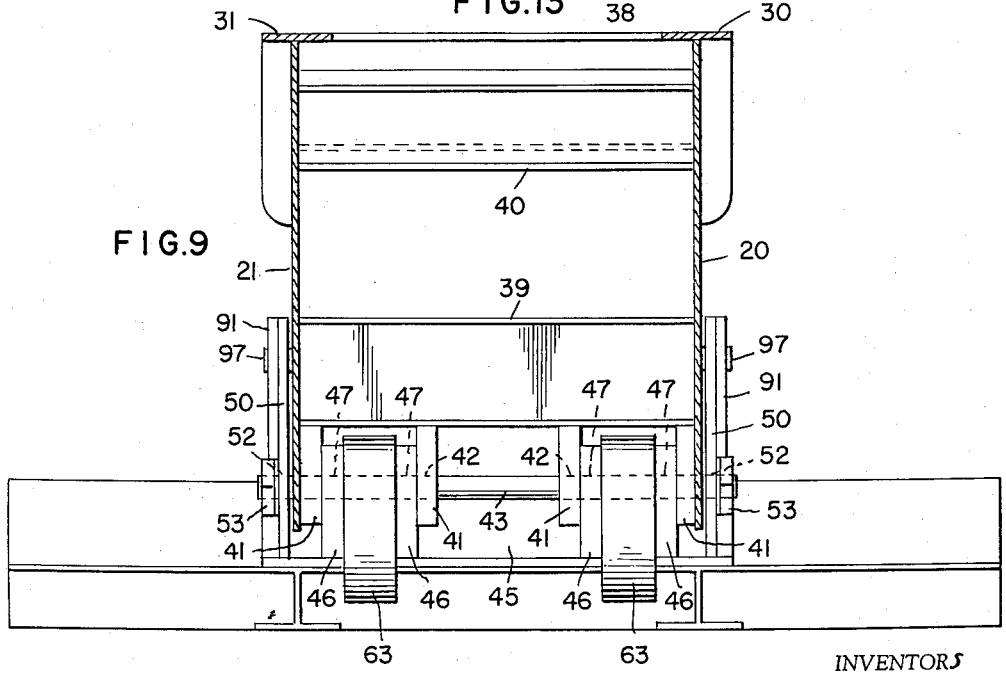

2,967,720
Patented Jan. 10, 1961

2,967,720

DETACHABLE GOOSENECK FOR TRAILERS AND THE LIKE

Rudolph C. Smith and Elmer Benson, Jr., Harrisburg, Pa., assignors to L. B. Smith, Inc., Camp Hill, Pa., a corporation of Pennsylvania Filed Feb. 7, 1958, Ser. No. 713,858

21 Claims. (Cl. 280—425)

The present invention relates to a detachable gooseneck for trailers or the like, and more particularly to a detachable gooseneck utilized with heavy duty trailers employed for transporting heavy machines and equipment.

Heavy duty trailers of the type used for transporting large tractors, cranes and the like usually comprise an elongated body means with a low center of gravity, the rear end of the trailer body being supported upon suitable wheel assemblies and the front end of the trailer being adapted to be secured to a trailer by some sort of detachable mechanism which usually is in the form of a gooseneck device.

It is desirable that the body of such trailers have as low a center of gravity as possible for stability and in order to provide sufficient overhead clearance for equipment carried thereon, and as a consequence the wheels of the trailer often extend above the body thereof whereby certain problems are created in loading the equipment upon the trailers. In the past, in some cases such equipment was loaded upon the trailer from the rear end thereof, thereby necessitating either moving the equipment over the wheels at the rear of the body or removing the wheels from the trailer and subsequently securing them in place after the equipment is in loaded position. Either of the aforementioned methods of loading the trailer from the rear is unsatisfactory for a number of reasons.

When equipment is loaded over the wheels of a trailer, it is necessary to provide suitable ramps which, of necessity, must be rather long in order to provide a suitable gradient for loading very heavy equipment. There is an ever present danger of the heavy load sliding off of or toppling from the ramp, and there is a further hazard of the load dropping upon the trailer as it leaves the ramp, thereby creating excessive loads on the trailer body.

If the wheels are removed from the trailer and the equipment loaded thereupon with the trailer body resting substantially at ground level, the trailer must subsequently be lifted by winches or jacks into position such that the wheels may be re-attached, thereby requiring the use of much auxiliary equipment and this operation is also time consuming and hazardous due to the extremely heavy loads involved which may be on the order of 100 tons.

Due to the many inherent disadvantages of loading trailers from the rear thereof, it is desirable to load the trailer from the front, thereby eliminating many of the problems involved in loading operations. Various gooseneck arrangements have been designed to enable loading from the front of the trailer, but many of such prior art arrangements have proved to be unsatisfactory due to certain additional problems which have been encountered in such arrangements. One of the major problems involved with certain devices of this type is elevating the forward end of the trailer into proper operating position relative to the gooseneck, whereupon the gooseneck and trailer may be attached to one another and fixed in proper relationship. Winch and cable arrangements have been employed for elevating the front end of a trailer. Various other arrangements have been employed for elevating the forward end of the trailer, such as providing hydraulically operated ground engaging pistons on the gooseneck which are adapted to be extended with the lower ends thereof in engagement with the ground for lifting the gooseneck and attached trailer into towing position, whereupon they may be secured in place.

Another known arrangement comprises a hydraulically operated, depending lifting arm mounted in the gooseneck adapted to be hooked to the forward end of the trailer to lift the same upwardly into interlocking engagement with the lower surface of the gooseneck in an elevated or traveling position, and to lower the trailer to the ground, whereupon the lifting arm may be unhooked and the gooseneck removed.

The present invention provides an improved arrangement wherein the elevating means for lifting the front end of the trailer into proper towing position is incorporated in the gooseneck device, thereby providing an arrangement wherein the trailer may be loaded from the front end thereof and subsequently elevated into proper position in a simple and efficient manner. The gooseneck according to the present invention also provides a means for adjusting the relative positions of the trailer body and gooseneck such that the trailer may be towed in a number of different positions according to the particular road over which it travels. For example, if it is desired to travel over obstacles in the road, such as elevated railroad crossings and the like, the trailer may be towed in a high position to avoid striking such obstacles. If, on the other hand, it is necessary to travel under some overhead obstacles, the trailer may be towed in a low position to provide sufficient clearance between the top of the equipment thereon and the obstacles. The present invention provides a simple compact structure wherein cables and ground engaging members or the like are eliminated.

The gooseneck is provided with a forwardly extending means for securing it to the rear end of a conventional tractor, and a support assembly is provided for connecting the lower rear portion of the gooseneck to a trailer. The support assembly is pivotally supported by the frame of the gooseneck and is provided with a latching means adapted to engage cooperating latching means secured to the forward end of the trailer. Coupling means in the form of hook-like dependent members are also supported by the frame and are adapted to engage cooperating coupling means on the forward end of the trailer for rigidly securing the trailer to the support assembly. Operating means is provided for urging the coupling members of the gooseneck into operative relationship with the coupling means on the trailer, and an additional operating means is provided for adjusting relative position of the support assembly and the gooseneck, whereby the trailer can be moved either into a normal travel position, a high travel position or a low travel position as desired.

An object of the present invention is to provide a new and novel detachable gooseneck for trailers or the like enabling a trailer to be loaded from the front end thereof and to be towed in varying positions relative to the gooseneck and associated tractor.

A further object is to provide a detachable gooseneck which may be readily connected to and disconnected from an associated trailer and tractor in an improved manner.

Yet another object is to provide a detachable gooseneck including improved means for rigidly securing a trailer to the gooseneck, thereby preventing accidental disconnection of the trailer therefrom during operation.

A still further object of the invention is the provision of an improved detachable gooseneck which is sturdy and reliable in operation, yet simple and inexpensive in construction.

Other objects and many attendant advantages of the present invention will become more obvious when considered in connection with the following specification and drawings wherein:

Fig. 1 is a side elevation of a tractor and trailer combination incorporating the invention gooseneck.

Fig. 2 is a top view of a portion of the mechanism shown in Fig. 1,

Fig. 3 illustrates the mechanism in normal travel position,

Fig. 4 illustrates the mechanism in high travel position,

Fig. 7 illustrates the mechanism in disengaged position,

Figure 5:
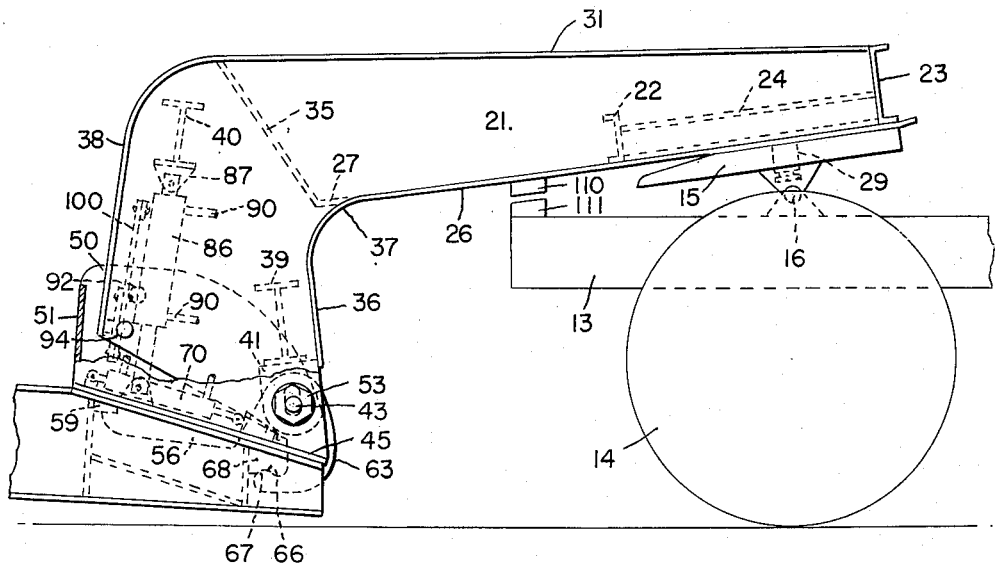
Fig. 5 illustrates the mechanism in low travel position.

Fig. 8 is a view taken on line 8—8 of Fig. 3 looking in the direction of the arrows, Fig. 9 is a view taken on line 9—9 of Fig. 3 looking in the direction of the arrows, Fig. 10 is a view taken on line 10—10 of Fig. 8 looking in the direction of the arrows, Fig. 11 is a top view of a portion of the flattened plate of the support assembly showing the latching means of the support assembly in engagement with the latching means of the trailer, Fig. 12 is a view taken on line 12—12 of Fig. 11 looking the direction of the arrows, Fig. 13 is a top view of the forward portion of the platform of the trailer, Fig. 14 is a view taken on line 14—14 of Fig. 10 looking in the direction of the arrows and showing the coupling members of the gooseneck in locked position with the coupling means of the trailer, and Fig. 15 is a view similar to Fig. 14 showing the coupling members of the gooseneck in unlocked position relative to the coupling means of the trailer.

Referring now to the drawings wherein like reference characters designate corresponding parts throughout several views, there is shown in Fig. 1 a tractor-trailer combination incorporating the invention gooseneck wherein the tractor is indicated generally by reference numeral 10, the trailer is indicated generally by reference numeral 11 and the gooseneck is indicated generally by reference numeral 12. The tractor has a rearwardly extending frame 13 and a wheel assembly 14 supporting the rear end thereof. A conventional fifth wheel assembly 15 is pivotally mounted about an axis 16 extending transversely of the frame of the tractor in a manner well known in the art. The trailer is of conventional girder or I-beam type construction having an elongated body including a lower forwardly extending portion 17 and a higher rear portion 18, the rear end of the trailer being supported by wheel assemblies 19. The construction of the trailer is of a conventional nature and is well known in the art.

As seen most clearly in Fig. 2, two elongated side members 20 and 21 are disposed in parallel spaced relationship with one another, a beam 22 extending transversely to and having its opposite ends in engagement with the side members, and another beam 23 extending between and being connected to the opposite end portions of the side members. Longitudinally extending beams 24 and 25 are disposed between and in engagement with beams 22 and 23. A flattened plate 26 is secured to the lower edges of the side members 20 and 21 and extends from the bend line indicated at 27 to the forward end of the side members. Plate 26 is provided with an opening 28 which receives the kingpin 29 of the fifth wheel assembly of the tractor, the lower surface of the plate 26 serving as a main bearing surface for cooperation with the upwardly facing surface of the fifth wheel. In this manner, the gooseneck assembly is rigidly secured to the tractor and may pivot about the horizontal axis 16 and the axis of the kingpin.

A web member 30 is secured to the upper edge of side member 20 and a similar web member 31 is secured to the upper surface of the side member 21. Plate 26 is of smaller width rearwardly of the bend line 27 such that it may be bent upwardly at an angle as seen most clearly in Fig. 7 such that the rear portion 35 thereof extends upwardly and terminates adjacent the upper surface of side members 20 and 21. Similar web members 36, only one of which may be seen in Fig. 7, are secured to the forward edge of the downwardly extending portion of each of the side members and abut at their upper end portions with a shoulder 37 formed in opposite edges of the plate 26 by cutting a small transverse slot therein forwardly of bend line 27. A front plate 38 is secured to the rear edges of the downwardly extending portion of each of the side members and the upper end of plate 38 abuts the rear edge of each of the web members 30 and 31. A first I-beam 39 extends transversely between and has its opposite ends secured to the side members 20 and 21 and a second I-beam 40 is also connected between the side members. Each of the side members, beams, webs and plates comprising the frame assembly are preferably welded together to provide a rigid and sturdy unit.

As seen most clearly in Fig. 9, four similar bracket members 41 are secured to the lower surface of beam 39 and extend downwardly therefrom. Each of the brackets 41 has an opening 42 formed therethrough, and a transversely extending shaft 43 is rotatably journalled within the openings. Shaft 43 also extends through suitable openings provided in each of side members 20 and 21. A flattened plate 45 has four similar bracket members 46 secured to the upper surface thereof, each of these bracket members having an opening 47 formed therethrough. Shaft 43 is rotatably journalled within each of openings 47 and thereby supports bracket members 46 and flattened plate 45 rotatably thereon. Flattened plate 45 is substantially rectangular in configuration, and has a pair of side plates 50 secured adjacent opposite edges thereof extending upwardly therefrom. Shaft 43 is also journalled through suitable openings 52 provided through each of side plates 50 and the outer ends of the shaft are threaded and have nuts 53 threaded thereon for maintaining the shaft in proper operative position. The rear edges of side plates 50 are joined to one another by a transversely extending back plate 51, the opposite ends of which are secured to the side plates 50 at opposite sides of the flattened plate 45. The side plates 50 and back plate 51 form a protective shield such that upon pivotal movement of flattened plate 45 about the axis of shaft 43, the mechanism supported in the interior of the frame will be protected from the entrance of foreign objects. Flattened plate 45 and each of the components supported thereby may be considered a support assembly which is mounted for pivotal movement about the axis of shaft 43.

A latching means indicated generally by reference numeral 55 is secured to the lower surface of flattened plate 45 of the support assembly, and as seen most clearly in Fig. 11, comprises two elongated members 56 which converge toward the rear of the gooseneck, each of members 56 being provided with a notch 57 formed at the rear end thereof. Latching means 55 of the gooseneck is adapted to cooperate with a complementary latching means formed on the forward end of the body of the trailer which, as seen most clearly in Fig. 13, includes a pair of converging guide members 58 adapted to engage members 56 of the latching means formed on the gooseneck to guide the latching means into proper operative position. A latching member 59 extends transversely of the body of the trailer between guide members 58 and is adapted to fit in notches 57 of latching members 56. Fig. 12 illustrates the manner of engagement between the latching means formed on the support assembly and the latching means formed on the trailer, the lower surface of flattened plate 45 being in engagement with a correspondingly sloping upper surface 60 formed on the forward end of the trailer body, whereby this interconnection prevents relative transverse or vertical movement between the forward end of the trailer and the support assembly of the gooseneck.

A coupling means is also provided for preventing relative longitudinal movement between the trailer and the gooseneck, whereby the trailer is securely connected to the gooseneck preventing accidental disconnection therebetween during operation. Two similar hook-like coupling members 63 are provided with elongated openings 65 therethrough as seen most clearly in Figs. 14 and 15, and shaft 43 extends through these openings whereby the coupling members are mounted upon shaft 43 for sliding and pivotal movement relative thereto. Coupling members 63 extend downwardly through slots 65 formed in the forward edge of flattened plate 45 of the support assembly, and are provided at the lower portion thereof with a rounded locking surface 66 which is adapted to engage a complementary surface 67 formed on a coupling member 68 mounted upon the forward end of the trailer and extending transversely thereof. When in locking position as illustrated in Fig. 14, the co-operating coupling means are mounted on the gooseneck and the trailer providing secure connection therebetween, and in the unlocked position as illustrated in Fig. 15, the gooseneck may be readily disconnected from the trailer.

Movable operating means is mounted upon the upper surface of flattened plate 45 for actuating hook-like members 63 into operative position, and includes a pair of hydraulic cylinders 70 having suitable connection 71 to a source of hydraulic pressure (not shown). The rear end of each of cylinders 70 is anchored to a bracket 72 mounted upon the upper surface of plate 45 and the forward end of each of the pistons within cylinders 70 is secured to a wedge-like member 73, the flattened bottom surface of which is adapted to slide along the upper surface of plate 45. The upper surface 75 of wedge-member 73 comprises a sloping cam surface which co-operates with and engages a correspondingly sloped cam surface 76 formed on each of hook-like members 63. When hydraulic pressure is supplied to cylinder 70 so as to extend the piston therefrom, wedge members 73 are urged into the position shown in Fig. 14, whereupon the hook members 63 are urged upwardly such that locking surfaces 66 and 67 are brought into engagement with one another, thereby locking the support assembly to the trailer. When hydraulic pressure is supplied to the cylinders 70 so as to withdraw the wedges from the position shown in Fig. 14 to the position shown in Fig. 15, the weight of the hook members will cause them to move downwardly into the position shown in Fig. 15, whereupon the gooseneck and trailer may be disengaged from one another.

A locking means is provided for securing the wedge members in position as shown in Fig. 14 where the coupling means of the gooseneck and trailer are in locked position, and comprises a pair of locking members 80 for each wedge member, the locking members 80 being pivotally mounted upon suitable brackets 81 secured to the top surface of the plate 45. It is apparent, as shown in Fig. 14, that the wedge members 73 are positively held in the position shown since any tendency thereof to move away from hook members 63 will apply a force to locking members 80 tending to pivot them downwardly about their pivotal axis 82, but such further movement is prevented since locking members are in engagement with the upper surface of plate 45. Locking members 80 may be selectively moved into either locked or unlocked position by means of a rod 83 secured to each of the locking members and extending laterally through a suitable opening 84 provided in side plate 50 which is on the highway side or adjacent side member 20 of the gooseneck. The outer end of rod 83 is provided with a handle 85 which may be manually grasped to rotate the locking members into the desired position.

A second operating means for adjusting the relative position of the support assembly with respect to the gooseneck comprises a pair of similar hydraulic cylinders 86 having the upper ends thereof anchored to flanges 87 secured to the lower surface of beam 40, and the outer end of the piston disposed within the cylinders is secured to suitable brackets 88 secured to the upper surface of flattend plate 45. Hydraulic pressure is supplied to cylinders 86 through conduits 90 conected to a suitable source of hydraulic pressure (not shown). When hydraulic pressure is supplied to cylinders 86 such as to move the pistons therein outwardly, flattened plate 45 and the support assembly are rotated downwardly as seen in the drawings with respect to the gooseneck, and the support assembly may be rotated upwardly about the axis of shaft 443 upon reversing the hydraulic pressure within cylinders 86.

Although no source of hydraulic pressure has been shown for supplying pressure to the hydraulic cylinders of the device, it is obvious that any conventional hydraulic pump may be employed for this purpose. A small gasoline engine may be mounted on the top of the gooseneck driving a suitable hydraulic pump, or a hydraulic pump may be mounted on the tractor and connected to the hydraulic cylinders of the gooseneck by means of conventional coupling hoses. Operation of hydraulic cylinders 70 may be controlled by means of a conventional form of a valve mounted on the highway side of the gooseneck and a similar valve may be employed for controlling the operation of hydraulic cylinders 86.

A locking means is also provided for securing the support assembly and the gooseneck in normal towing position relative to one another which, of course, also locks the trailer in normal towing position relative to the gooseneck when the trailer is secured to the support assembly. Side plates 50 are each provided at their rearward ends with reinforcing plates 91 secured thereto, an opening 92 being provided through adjacent portions of each of the side plates and its associated reinforcing plate. Each of the side members 20 and 21 is also provided with a reinforcing plate 93, an opening 94 being provided through adjacent portions of each of the side members and their associated reinforcing plates.

A pair of shafts 95 is slidably mounted in brackets 96 mounted on the inner surface of front plate 38 of the device, each of shafts 95 having a heavy locking lug 97 formed at the outer end thereof and adapted to extend through openings 92 and 94. Each of shafts 95 has a radially extending shoulder 98 formed integrally therewith, and a spring 99 is disposed about shaft 95 and has the opposite site ends thereof seated against each of shoulders 98 and brackets 96, whereby the shafts 95 and associated lugs 97 are each urged outwardly toward locking position. Fig. 8 illustrates the locking lugs 97 in locking position with the lugs extending through aligned openings 92 and 94. Openings 92 and 94 are aligned when the trailer is in normal towering position relative to the gooseneck as illustrated in Fig. 3. When the trailer and attached support assembly are in any other position relative to the frame of the gooseneck, openings 92 and 94 will not be aligned and the locking means will not operate to positively lock the support assembly and gooseneck relative to one another. Although only one opening 92 has been illustrated as being formed through the side plates and associated strengthening members, it is apparent that other openings may be provided for locking the support assembly in various positions relative to the frame of the gooseneck.

Referring again to Fig. 8, a means is provided for selectively operating the support assembly locking means and comprises an elongated lever 100 pivotally mounted on a shaft 101 secured to the inner surface of front plate 38 of the frame. Connecting links 102 are each pivotally connected at one end thereof to lever 100, and have the opposite ends thereof pivotally connected to the inner ends of shafts 95. A second elongated lever 103 has the inner end thereof pivotally connected to lever 100 and extends outwardly through a suitable opening 104 provided in side member 20. The outer end of lever 103 is provided with a handle portion 105 which may be manually grasped and pulled outwardly to disengage the locking means. A notch 106 is provided in the lever 103 for engaging a portion of side member 20 adjacent opening 104 for retaining the locking means in unlocked position. It is apparent that locking lugs 97 are urged outwardly by springs 99 and may be selectively moved inwardly by pivoting lever 100 through the intermediary of lever 103. It shall be noted that handle 105 is also disposed on the highway side of the gooseneck such that each of the control valves for operating the hydraulic cylinders, the handle for operating the locking means for the wedges and the handle for operating the locking means for the support assembly are all disposed adjacent one another for easy operation when desired.

Fig. 7 illustrates the gooseneck in disconnected position and in this position a stop member 110 secured to the lower surface of plate 26 engages a stop member 111 secured to the upper surface at the rear of the body of the tractor. These stop members limit the pivotal movement of the gooseneck with respect to the tractor such that the lower ends of hook-like members 63 are prevented from striking the ground and possibly causing injury thereto. The front end of the trailer is resting upon the ground as seen in Fig. 7 and the gooseneck and trailer are in position for attachment to one another.

When it is desired to attach the gooseneck to the trailer, cylinders 86 may first be actuated, if necessary, to pivot the support assembly and latching means 55 into proper position for engagement with the latching means on the trailer. The tractor may then be backed toward the trailer, whereupon latching members 56 will engage guide members 58 of the trailer to guide the support assembly and gooseneck into proper position. Notches 57 of latching member 56 will engage latching member 59 of the trailer and the lower surface of plate 45 will rest upon the upper surface 60 at the forward end of the trailer. Hydraulic cylinders 70 are then actuated such that wedges 73 are urged toward hook members 63, thereby causing the hook members to move upwardly into locking position. The support assembly is then rigidly secured to the forward end of the trailer.

Hydraulic cylinders 86 are then actuated to pivot the support assembly about the axis of shaft 43 into the desired towing position. The normal towing position is illustrated in Fig. 3 and when the gooseneck and support assembly are in this relative position, the support assembly locking means may be released, whereupon the springs 99 will urge locking lugs 97 into the position shown in Fig. 8. The tractor-trailer combination is then in normal towing position and is ready for operation. Prior to operation, the locking means for the wedges is preferably urged into locking position so as to positively prevent accidental disconnection of the trailer from the gooseneck during operation.

Figure 6:
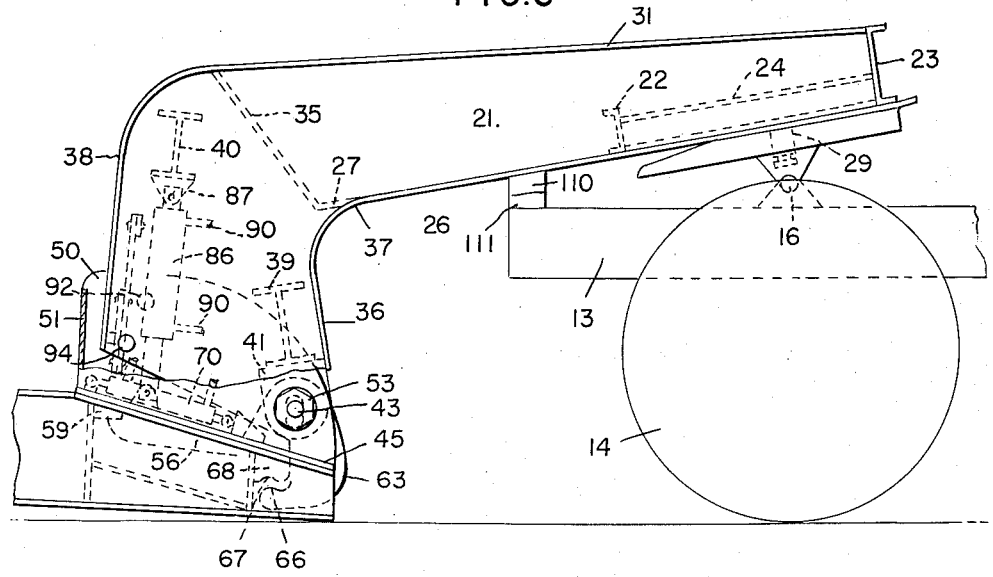
Fig. 6 illustrates the mechanism in unloading position.

If it is necessary to travel over obstacles in the roadway, such as railroad crossings or the like, hydraulic cylinders 86 may be further actuated to extend the pistons such that the support assembly is pivoted into the position shown in Fig. 4 wherein the high travel position is illustrated. If, on the other hand, it is necessary to travel under some overhead obstacles and it is desired to lower the load, the pistons may be drawn into the cylinders 86, thereby rotating the support assembly into the position shown in Fig. 5 which illustrates the low travel position. When it is desired to unload the trailer, the cylinders 86 may be actuated so as to rotate the support assembly into the position shown in Fig. 6 wherein the front end of the trailer is again resting on the ground. The gooseneck can then be disengaged from the trailer by unlocking the wedge members and actuating cylinders 70 such that the wedges are withdrawn from the position shown in Fig. 14 to the position shown in Fig. 15, whereby the coupling members 63 are disengaged from the coupling member 67 of the trailer. The gooseneck may then be completely disengaged by driving the tractor forwardly into the position shown in Fig. 7.

It is apparent from the foregoing that there is provided a new improved detachable gooseneck for trailers and the like wherein the trailer may be loaded from the front, and the trailer may be towed in a number of varying positions relative to the gooseneck. The present invention eliminates the necessity of using cables and winches or ground engaging members for elevating the trailer into operative position and the gooseneck may be readily connected to and disconnected from a trailer and tractor. Means is provided for locking the gooseneck and trailer in a desired towing position, and a further locking means is provided for preventing accidental disconnection between a trailer and gooseneck during towing operations. The apparatus is sturdy and reliable in construction and yet is relatively simple and inexpensive in construction.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A trailer including a body and wheel means supporting the rear end of the body, a gooseneck detachably connected at its lower portion to the forward end of the body, said body having first latching means and first coupling means adjacent the forward end thereof, said gooseneck including second latching means engageable with said first latching means and supported for pivotal movement relative to a portion of said gooseneck, said gooseneck also including second coupling means engageable with said first coupling means and supported for pivotal movement relative to a portion of said gooseneck, and means supported by said gooseneck and operatively connected to said second latching means for selectively adjusting the position of said second latching means relative to a portion of said gooseneck when said second latching means is in latching engagement with said first latching means.

2. In a trailer including a body and wheel means supporting the rear end of the body, said body having first latching means and first coupling means adjacent the forward end thereof, a gooseneck for the forward end of the body and including a frame, a support assembly pivotally supported by said frame and including second latching means on the lower portion thereof for engaging said first latching means, second coupling means pivotally supported by said frame for engaging said first coupling means, and means supported by said frame and operatively connected to said support assembly for selectively adjusting the position of said support assembly relative to said frame when said second latching means is in latching engagement with said first latching means.

3. Apparatus as defined in claim 2 including means for locking said support assembly and said frame in position relative to one another.

4. Apparatus as defined in claim 2 including movable means mounted on said support assembly for moving said second coupling means into coupling engagement with said first coupling means.

5. Apparatus as defined in claim 4 including means for locking said movable means in position so as to maintain said second coupling means in engagement with said first coupling means.

6. A trailer including a body and wheel means supporting the rear end of the body, said body having first latching means and first coupling means adjacent the forward end thereof, a gooseneck for connection at its lower portion to the forward end of the body and having a forwardly extending upper portion adapted to be connected to a tractor, said gooseneck including a frame, a transversely extending shaft journalled in said frame, a support assembly pivotally supported by said shaft and including second latching means on the lower portion thereof for engaging said first latching means, second coupling means comprising at least one hook-like member pivotally connected to said shaft for engaging said first coupling means, whereby upon engagement of said first and second latching means and said first and second coupling means, said body and said support assembly are fixed relative to one another, and said body and said frame are pivotally connected to one another, and means for selectively adjusting the position of said support assembly relative to said frame.

7. Apparatus as defined in claim 6 including at least one wedge-like member slidably mounted on said support assembly for engagement with said second coupling means for moving said second coupling means into engagement with said first coupling means.

8. Apparatus as defined in claim 6 wherein said support assembly includes a first flat lower surface, said body having a sloping flat surface for receiving said first flat surface, said body also having converging guide means for guiding said second latching means into proper operative relationship with respect to said first latching means.

9. In a tractor-trailer combination including a trailer having a body and wheel means supporting the rear end of the body, a tractor having an upwardly exposed fifth wheel member pivotally mounted thereon, said body means having first latching means and first coupling means adjacent the forward end thereof, a detachable gooseneck connected at its lower portion to the forward end of the body and having a forwardly extending upper portion connected to said fifth wheel, said gooseneck including a frame, a support assembly pivotally mounted on said frame and including second latching means on the lower portion thereof engaging said first latching means, second coupling means pivotally supported by said frame and engaging said first coupling means, said second latching means and said second coupling means being supported for pivotal movement about the same axis, and means for selectively adjusting the position of said support assembly relative to said frame.

10. The combination as defined in claim 9 including movable wedge means mounted on said support assembly for moving said second coupling means into engagement with said first coupling means to thereby rigidly connect said body to said support assembly, and means for selectively operating said wedge means.

11. In combination, a tractor having a fifth wheel pivotally mounted thereon for pivotal movement about an axis extending transversely of said tractor, a gooseneck including a frame having a forwardly extending upper portion secured to said fifth wheel, and adapted to pivot with respect to said tractor, a support assembly pivotally supported by said frame and including latching means for engaging cooperating latching means on a trailer, means supported by said frame and operatively connected to said support assembly for adjusting the relative position of said support assembly and said frame when said latching means on the support assembly is in latching engagement with the cooperating latching means on a trailer, coupling means pivotally supported by said frame for engaging cooperating coupling means on a trailer, and means for adjusting the relative position of said coupling means and said frame.

12. A device as defined in claim 11 including means for limiting relative pivotal movement of said gooseneck with respect to said tractor for preventing excessive downward movement of said gooseneck to protect it from damage.

13. A gooseneck which comprises a frame including a pair of side members secured in spaced relationship to one another, means at the forward end of said gooseneck for securing the gooseneck to a tractor, a transversely extending shaft journalled in said side members, a support assembly pivotally supported by said shaft and including means for latching the gooseneck to a trailer, at least one coupling member pivotally connected to said shaft for coupling the gooseneck to a trailer, means supported by said support assembly for operating said coupling means, and means supported by said frame for adjusting the relative position of said support assembly and said frame.

14. A device as defined in claim 13 wherein said coupling member comprises a substantially hook-like member having an elongated slot formed therein through which said shaft extends wherein said coupling member is adapted to move slidably and pivotally with respect to said shaft.

15. A device as defined in claim 13 including cooperating openings formed in said frame and said support assembly and locking means adapted to extend through said openings for positively locking said frame and said support assembly in a predetermined relative relationship to one another.

16. A gooseneck having means at the forward end thereof for securing the gooseneck to a tractor, said gooseneck including a pair of side members secured in spaced relationship to one another, a first support member secured to and extending transversely between said side members, a first plurality of bracket members secured to said first support member and extending downwardly therefrom, a transversely extending shaft journalled in said brackets and said side members, a support assembly including a flattened plate having a second plurality of bracket members secured to the upper surface thereof, said second plurality of brackets being pivotally supported by said shaft, a plurality of hook-like coupling members each of which has an elongated slot formed therein, said shaft extending through each of said slots to support said coupling members for sliding and pivotal movement with respect to said shaft, first operating means on said plate for adjusting the relative position of said coupling members and said frame, latching means secured to the lower surface of said plate, a second support member secured to and extending transversely between said side members, and second operating means supported by said second support member for adjusting the relative position of said support assembly and said frame.

17. A device as defined in claim 16 wherein said first control means includes a plurality of wedge members having cam surfaces formed thereon, each of said coupling members having cooperating cam surfaces formed thereon for engaging the cam surfaces of said wedge members whereby said coupling members are moved relative to said frame upon relative movement of said cam surfaces in engagement with one another.

18. A device as defined in claim 17 including a plurality of locking members pivotally supported on said plate for engaging said wedge members and locking said coupling members in position relative to said frame.

19. A device as defined in claim 16 wherein said support assembly includes a plurality of side plates each of which has an opening formed therethrough, said side members each having a cooperating opening formed therethrough, and locking means including a plurality of locking members each of which is adapted to extend through a cooperating pair of openings formed through one of said side members and an adjacent sideplate for positively locking said support assembly in a predetermined relative relationship to said frame.

20. A trailer including a body and wheel means supporting the rear end of the body, a gooseneck detachably connected at its lower portion to the forward end of the body, said body having first latching means and first coupling means adjacent the forward end thereof, said gooseneck including second latching means engageable with said first latching means and supported for pivotal movement relative to a portion of said gooseneck, said gooseneck also including second coupling means engageable with said first coupling means and supported for pivotal movement relative to a portion of said gooseneck, and means supported by said gooseneck and interconnected with said second latching means for selectively adjusting the position of said second latching means relative to a portion of said gooseneck, said second latching means and said second coupling means being mounted for pivotal movement about the same axis.

21. Apparatus as defined in claim 20, including means supported by said gooseneck and interconnected with said second coupling means for selectively moving said second coupling means into coupling engagement with said first coupling means.

References Cited in the file of this patent

UNITED STATES PATENTS

| | | |
|---|---|---|
| 2,545,584 | Meadows | Mar. 20, 1951 |
| 2,822,945 | Duffy | Feb. 11, 1958 |